(12) United States Patent
Peng et al.

(10) Patent No.: US 11,649,711 B2
(45) Date of Patent: May 16, 2023

(54) METHOD FOR IMPROVING RECOVERY RATIO OF BRAIDED WELL PATTERN OF HUGELY THICK OR MULTI-LAYER OIL AND GAS RESERVOIR

(71) Applicant: SOUTHWEST PETROLEUM UNIVERSITY, Chengdu (CN)

(72) Inventors: Xiaolong Peng, Chengdu (CN); Suyang Zhu, Chengdu (CN); Chaowen Wang, Chengdu (CN); Peng Deng, Chengdu (CN); Ning Feng, Chengdu (CN); Haoqiang Wu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 90 days.

(21) Appl. No.: 17/368,199

(22) Filed: Jul. 6, 2021

(65) Prior Publication Data
US 2022/0010666 A1    Jan. 13, 2022

(30) Foreign Application Priority Data
Jul. 8, 2020    (CN) .......................... 202010650993.2

(51) Int. Cl.
*E21B 43/30* (2006.01)
*E21B 49/00* (2006.01)
*G01V 99/00* (2009.01)

(52) U.S. Cl.
CPC ............ *E21B 43/30* (2013.01); *E21B 49/003* (2013.01); *E21B 2200/20* (2020.05); *G01V 99/005* (2013.01)

(58) Field of Classification Search
None
See application file for complete search history.

(56) References Cited

U.S. PATENT DOCUMENTS

| | | | |
|---|---|---|---|
| 8,751,208 B2 * | 6/2014 | Brouwer | E21B 43/305 703/10 |
| 2011/0024126 A1 * | 2/2011 | Brouwer | E21B 47/022 703/2 |

FOREIGN PATENT DOCUMENTS

CN    103362485 A    10/2013

OTHER PUBLICATIONS

CN103362485A, IDS record, translation (Year: 2013).*

* cited by examiner

*Primary Examiner* — Lina M Cordero
(74) *Attorney, Agent, or Firm* — Muncy, Geissler, Olds & Lowe, P.C.

(57) ABSTRACT

The invention discloses a method for improving a recovery ratio of a braided well pattern of a hugely thick or multi-layer oil and gas reservoir, which improves the recovery ratio of the hugely thick or multi-layer oil and gas reservoir by designing the braided well pattern. The braided well pattern is designed through the following method: dividing a cubic development unit of the oil and gas reservoir; measuring a physical property parameter of the cubic development unit; calculating a well pattern design parameter according to the physical property parameter, wherein the well pattern design parameter includes a number of wells and a well bore track; and drilling a large-displacement horizontal well according to the well pattern design parameter. The step of dividing the cubic development unit of the oil and gas reservoir specifically includes: obtaining a boundary of the oil and gas reservoir through seismic volume data; obtaining a main layer series of development of the oil and gas reservoir according to a geological model established on the basis of a prospecting parameter; and establishing a cube with a largest volume in the main layer series of development, wherein the cube is the cubic devel- (Continued)

opment unit. The invention can effectively improve the recovery ratio of the hugely thick or multi-layer oil and gas reservoir.

5 Claims, 2 Drawing Sheets

METHOD FOR IMPROVING RECOVERY RATIO OF BRAIDED WELL PATTERN OF HUGELY THICK OR MULTI-LAYER OIL AND GAS RESERVOIR

TECHNICAL FIELD

The present invention relates to the field of oil and gas exploitation technologies, and more particularly, to a method for improving a recovery ratio of a braided well pattern of a hugely thick or multi-layer oil and gas reservoir.

BACKGROUND ART

Due to huge geological reserves, the efficient improvement of a hugely thick or multi-layer oil and gas reservoir can improve an energy structure in China and supplement the shortage of a conventional oil and gas reservoir in regional distribution and supply quantity in China. Due to a high Young's modulus of the hugely thick or multi-layer oil and gas reservoir, a fracturing effect of the reservoir is poor, and a fracturing measure has a poor production effect on the reservoir. Meanwhile, the hugely thick or multi-layer oil and gas reservoir is relatively thicker, so that it is difficult to use the reservoir efficiently through a vertical well and a conventional horizontal well. Therefore, it is difficult to use the reservoir effectively, and it is also difficult to further improve a recovery ratio of a well pattern. However, the layout of a spatial well pattern can effectively increase a control area of an oil well. Therefore, the design of the spatial well pattern is a key issue in the development and design of the hugely thick or multi-layer oil and gas reservoir.

At present, scholars at home and abroad have done a great deal of work on the well pattern of the hugely thick or multi-layer oil and gas reservoir for improving the recovery ratio, and they generally refer to the well pattern design of a sandstone medium, or the combined well pattern design of a horizontal well and a vertical well. However, aiming at the hugely thick or multi-layer oil and gas reservoir, there is no efficient development well pattern design and no design of improving the recovery ratio of the development well pattern with a large displacement space. The design and research of improving the recovery ratio of the spatial well pattern of the hugely thick or multi-layer oil and gas reservoir is still in exploration, and no scholars have done the design of improving the recovery ratio of the spatial well pattern with a large displacement well.

SUMMARY OF THE INVENTION

Aiming at the above problems, the present invention aims to provide a method for improving a recovery ratio of a braided well pattern of a hugely thick or multi-layer oil and gas reservoir, which improves the recovery ratio of the hugely thick or multi-layer oil and gas reservoir by designing the braided well pattern.

The technical solutions of the present invention are as follows.

According to the method for improving the recovery ratio of the braided well pattern of the hugely thick or multi-layer oil and gas reservoir, the recovery ratio of the hugely thick or multi-layer oil and gas reservoir is improved by designing the braided well pattern, and the braided well pattern is designed through the following method: dividing a cubic development unit of the oil and gas reservoir; measuring a physical property parameter of the cubic development unit; calculating a well pattern design parameter according to the physical property parameter, wherein the well pattern design parameter includes a number of wells and a well bore track; and drilling a large-displacement horizontal well according to the well pattern design parameter to obtain the braided well pattern.

Preferably, the step of dividing the cubic development unit of the oil and gas reservoir specifically includes: obtaining a boundary of the oil and gas reservoir through seismic volume data; obtaining a main layer series of development of the oil and gas reservoir according to a geological model established on the basis of a prospecting parameter; and establishing a cube with a largest volume in the main layer series of development, wherein the cube is the cubic development unit.

Preferably, a measuring method of the physical property parameter specifically includes: measuring a length, a width, and a height of the cube development unit; and obtaining a porosity, a permeability, and a saturation of the cubic unit from the geological model.

Preferably, a calculating method of the well pattern design parameter specifically includes:

calculating a density of the well pattern:

$$E_R = E_d e^{-B/S} \quad (1)$$

$$B = a\left(\frac{kh}{\mu}\right)^2 - b\left(\frac{kh}{\mu}\right) + c \quad (2)$$

wherein $E_R$ is an oil field recovery ratio, which is a decimal; $E_d$ is a displacement efficiency, which is a decimal; e is a natural base; B is a well pattern index in unit of well/km²; S is the density of the well pattern in unit of well/km²; a, b and c are fitting parameters, which are decimals; and k is a permeability of the oil and gas reservoir, h is a thickness of the cubic development unit, and $\mu$ is a viscosity of crude oil in unit of mPa·s;

calculating a plane area of the cube development unit according to the length and the width of the cube development unit, and multiplying the plane area by the density of the well pattern to obtain the number of wells; and according to the number of wells, uniformly and orthogonally arranging the wells in the cubic development unit to form a spatial braided well pattern, and calculating the well bore track in a length direction and a width direction by the following formulas:

$$x = h\sin\left(\frac{n\pi y}{l_y} + y_i\right) \quad (3)$$

$$y = h\sin\left(\frac{n\pi x}{l_x} + x_i\right) \quad (4)$$

wherein x and y are well bore coordinates along a horizontal well bore direction and a vertical oil reservoir direction respectively; n is a braiding degree of the well pattern, with a value ranging from 2 to 6; $1_x$ and $1_y$ are the length and the width of the cube development unit respectively in unit of km; $x_i$ is a starting point phase angle of an $i^{th}$ crack in a length direction; $y_i$ is a starting point phase angle of the $i^{th}$ crack in a width direction, an angle between $x_i$ and $y_i$ is 90 degrees, and an angle between $x_i$ and $x_{i+1}$, and an angle between $y_i$ and $y_{i+1}$ are 90 degrees respectively.

Preferably, the oil field recovery ratio is calibrated through a numerical simulation method; the displacement efficiency is calculated through a relative permeability curve; and the fitting parameters are calculated through a porosity and a saturation. A specific method refers to the industry standard SY/T100112006, and will not be repeated herein.

Preferably, when i is an odd, $x_i=\pi/2$, and $y_i=0$; and when i is an even, $x_i=0$, and $y_i=\pi/2$. Similarly, values of $x_j$ and $y_j$ may also be as follows: when i is an odd, $x_j=0$, and $y_j=\pi/2$; and when i is an even, $x_j=\pi/2$, and $y_j=0$.

Compared with the prior art, the present invention has the following advantages.

According to the characteristic that the hugely thick or multi-layer oil and gas reservoir is difficult to be used in space, the present invention designs a large-displacement spatial well pattern coefficient of the hugely thick or multi-layer oil and gas reservoir, which creates a favorable condition for effective development of a large-displacement spatial well pattern of the hugely thick or multi-layer oil and gas reservoir, and makes up for a technical blank of improving the recovery ratio of the large-displacement spatial well pattern of the hugely thick or multi-layer oil and gas reservoir currently.

DETAILED DESCRIPTION OF THE PREFERRED EMBODIMENTS

In order to illustrate the technical solutions in the embodiments of the present invention or the prior art more clearly, the accompanying drawings which need to be used in describing the embodiments or the prior art will be briefly introduced hereinafter. Apparently, the accompanying drawings described hereinafter are only some embodiments of the present invention, those of ordinary skills in the art may further obtain other accompanying drawings according to these accompanying drawings without going through any creative work.

DETAILED DESCRIPTION OF THE PREFERRED EMBODIMENTS

The present invention is further described hereinafter with reference to the accompanying drawings and the embodiments. It is to be noted that the embodiments in the present application and the features in the embodiments may be combined with each other without conflict. Unless otherwise defined, the technical terms or scientific terms used in the present disclosure should have the general meanings understood by those with general skills in the field to which the present disclosure belongs. Similar terms such as "include" or "contain" used in the present disclosure mean that the elements or objects appearing before the terms cover the elements or objects listed after the terms and their equivalents, without excluding other elements or objects.

Taking a hugely thick carbonate oil reservoir in Brazil as an example, a boundary of the oil and gas reservoir is obtained through seismic volume data, a main layer series of development of the oil reservoir is obtained according to a geological model established on the basis of a prospecting parameter, and a cube with a largest volume is established in the main layer series of development, so that the cube does not exceed the boundary of the main layer series of development, wherein the cube is a cubic development unit of the oil reservoir.

Measurement results of physical property parameters of the cubic development unit of the oil reservoir are as follows: a length is 4000 m, a width is 4000 m, and a height is 100 m, and a porosity, a permeability, and an oil saturation of the cubic development unit of the oil reservoir from the geological model are 1.2%, 45 mD, and 80% respectively.

Figure 1:
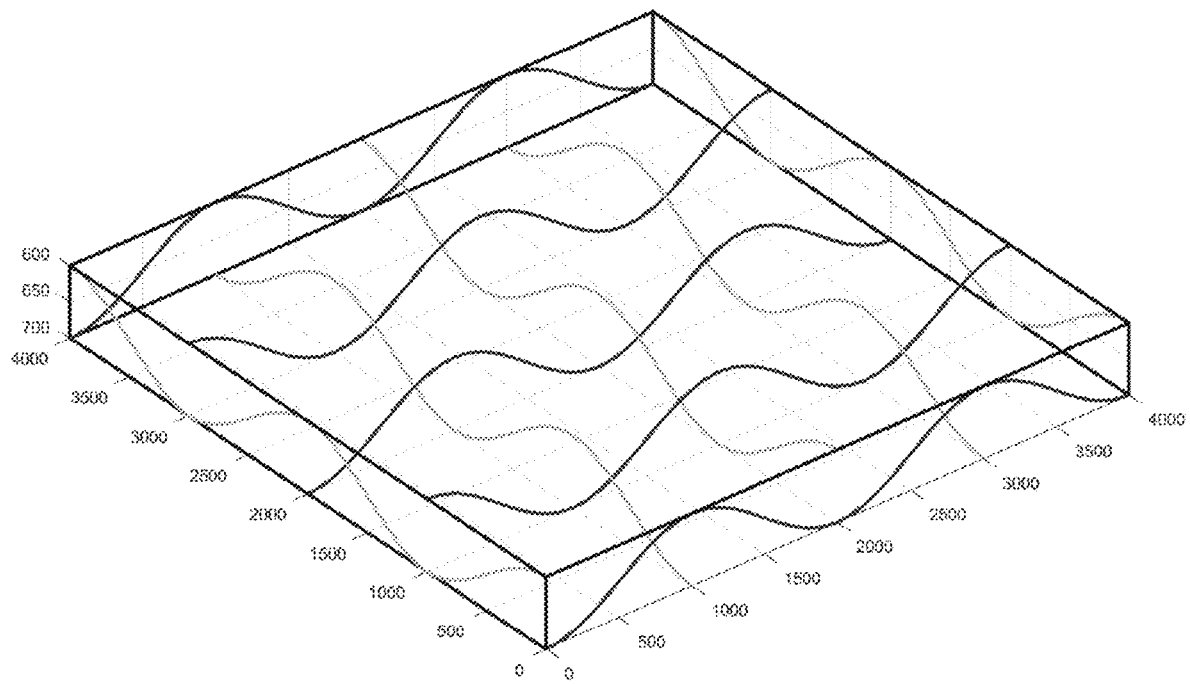
FIG. 1 is a schematic diagram of a well pattern design of a carbonate reservoir according to an embodiment of the present invention.

According to calculation formulas (1) and (2), a density S of a well pattern is calculated to be 0.625 well/km$^2$, 10 wells are required by multiplying with an area (4 km×4 km), and the 10 wells are uniformly and orthogonally arranged in the cubic development unit of the oil reservoir. A well bore track in length and width directions is calculated according to calculation formulas (3) and (4). In the embodiment, a braiding degree n of the well pattern is taken as 4, and a design result of the well pattern is shown in FIG. 1.

Figure 2:
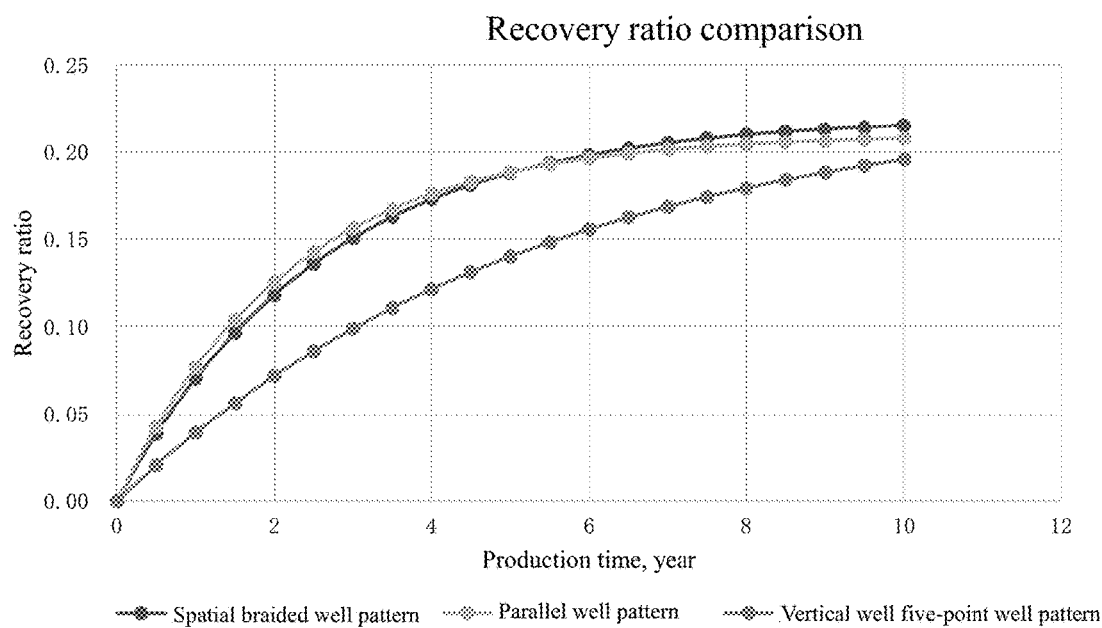
FIG. 2 is a schematic diagram of comparison results of recovery ratios according to an embodiment of the present invention.

A large-displacement horizontal well is drilled along the designed well bore track. The well bore track may have a slight error during drilling, and it is not necessary to follow the designed well bore track completely. A recovery ratio of a spatial braided well pattern designed by the present invention and recovery ratios of conventional well patterns (spatial parallel well pattern and vertical well five-point well pattern) are shown in FIG. 2. It can be seen from FIG. 2 that after 10 years of production, the recovery ratio of the spatial braided well pattern of the present invention is 21.53%, the recovery ratio of the spatial parallel well pattern is 20.77%, and the recovery ratio of the vertical well five-point well pattern with same input is 19.56%. Compared with the recovery ratios of the spatial parallel well pattern and the vertical well five-point well pattern, the recovery ratio of the spatial braided well pattern of the present invention is increased by 0.76% and 1.97% respectively, which is an obvious improvement for the oil reservoir. For an oil reservoir with 1 million tons of reserves, the recovery ratio of the spatial braided well pattern of the present invention can be increased by 7,600 tons and 19,700 tons respectively compared with the recovery ratios of the spatial parallel well pattern and the vertical well five-point well pattern.

Figure 3:
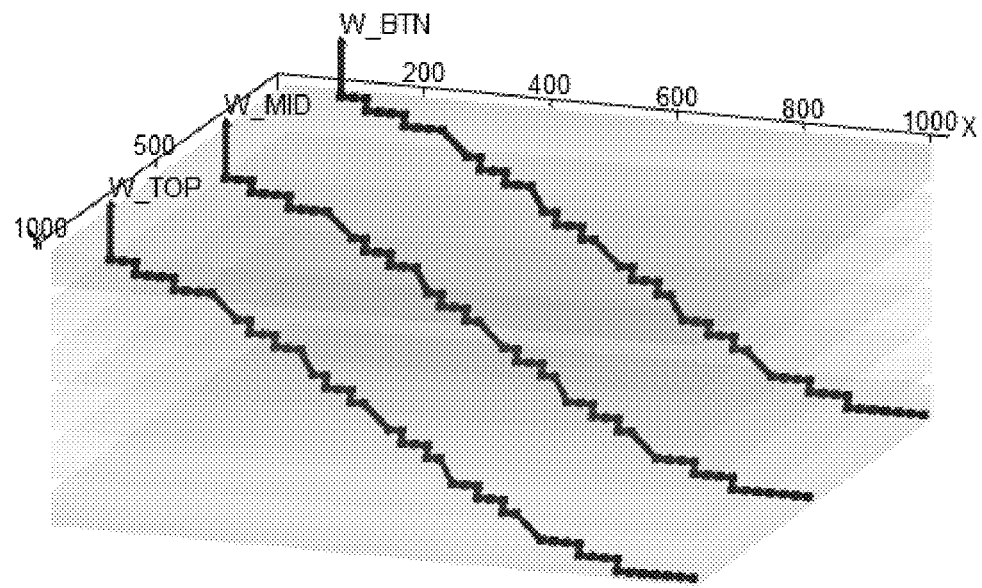
FIG. 3 is a schematic diagram of a spatial parallel well pattern unit according to an embodiment of the present invention.
Figure 4:
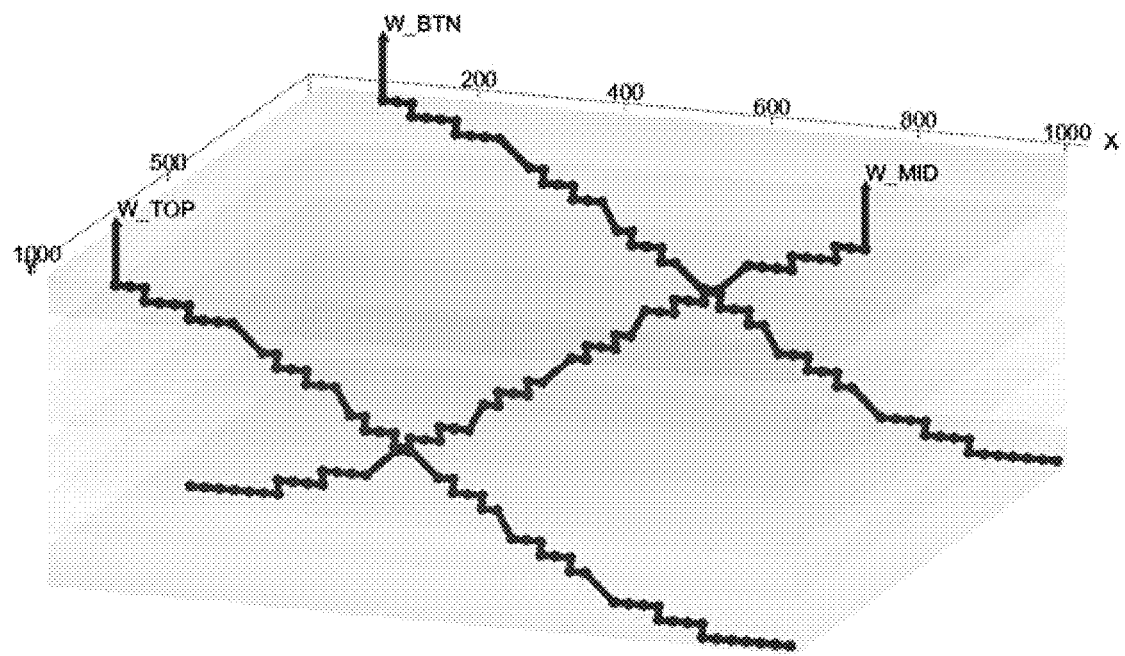
FIG. 4 is a schematic diagram of a spatial braided well pattern unit according to an embodiment of the present invention.

A spatial parallel well pattern unit is shown in FIG. 3, and a spatial braided well pattern unit is shown in FIG. 4. For a target block, a vertical well employs a traditional five-point well pattern, so that the number of wells corresponding to the five-point well pattern is 24, while investment on the vertical well is 32 Million Yuan/well, investment on the spatial horizontal well is 75 Million Yuan/well. Therefore, total investment on the spatial horizontal wells is 750 Million Yuan, and total investment on the vertical wells is 768 Million Yuan. Investment required by the present invention is far less than that required by the vertical well.

The above is only the preferred embodiments of the present invention, and does not limit the present invention in any form. Although the present invention has been disclosed by the preferred embodiments, the preferred embodiments are not intended to limit the present invention. Those skilled in the art can make some changes or modifications at equivalent embodiments with equivalent changes by using the technical contents disclosed above without departing from the scope of the technical solutions of the present invention. However, for the contents not departing from the scope of the technical solutions of the present invention, any simple modifications, equivalent changes and modifications made to the above embodiments according to the technical essence of the present invention are still included in the scope of the technical solutions of the present invention.

The invention claimed is:

1. A method for enhancing recovery efficiency of multilayer oil-gas reservoirs with weave well patterns comprising:
   enhancing the recovery efficiency of the multilayer oil-gas reservoirs by designing the weave well patterns, wherein said designing the weave well patterns includes dividing the multilayer oil-gas reservoirs into cubic exploitation units;
   measuring physical parameters of the cubic exploitation units;
   calculating design parameters of the weave well patterns, which include a well number and a wellbore trajectory, according to the physical parameters; and
   drilling out extended reach horizontal wells according to the design parameters of the weave well patterns to obtain the weave well patterns,
   wherein said calculating the design parameters of the weave well patterns includes:
      calculating a weave well pattern density according to Formulas 1 and 2, $$E_R = E_d e^{-B/S} \quad (1)$$

$$B = a\left(\frac{kh}{\mu}\right)^2 - b\left(\frac{kh}{\mu}\right) + c \quad (2)$$

wherein $E_R$ is a recovery efficiency of oilfields, in decimal; $E_d$ is a displacement efficiency, in decimal; e is a natural base; B is a well pattern index, in wells/km²; S is the weave well pattern density, in wells/km²; a, b and c are fitting parameters, in decimal; k is a permeability of the multilayer oil-gas reservoirs; h is a thickness of the cubic exploitation units; and μ is a viscosity of crude oil, in mPa·s;
      calculating a plane area of the cubic exploitation units by means of a length and a width of the cubic exploitation units, and obtaining the well number by multiplying the plane area by the weave well pattern density; and
      uniformly and orthogonally arranging wells in the cubic exploitation units to form a spatial weave well pattern according to the well number, wherein the wellbore trajectory in a length direction and a width direction is calculated out by Formulas 3 and 4:

$$x = h\sin\left(\frac{n\pi y}{l_y} + y_i\right) \quad (3)$$

$$y = h\sin\left(\frac{n\pi x}{l_x} + x_i\right) \quad (4)$$

wherein x and y are wellbore coordinates in a horizontal wellbore direction and a vertical oil-gas reservoir direction, respectively; n is a weave degree of the weave well patterns, ranging from 2 to 6; $l_x$, and $l_y$ are the length and the width of the cubic exploitation units, respectively, by km; $x_i$ is a phase angle of a starting point of an $i^{th}$ crack in the length direction; $y_i$ is a phase angle of a starting point of a $j^{th}$ crack in the width direction; an angle between $x_i$ and $y_i$ is 90°; and angles between $x_i$ and $x_{i+1}$, and $y_i$ and $y_{i+1}$ are 90°, respectively.

2. The method for enhancing the recovery efficiency of the multilayer oil-gas reservoirs with the weave well patterns according to claim 1, wherein said dividing the multilayer oil-gas reservoirs into the cubic exploitation units includes:
   obtaining a boundary of the multilayer oil-gas reservoirs from seismic volume data;
   obtaining a main exploitation strata of the multilayer oil-gas reservoirs, according to a geological model based on exploratory parameters; and
   creating a cube with a largest volume, which corresponds to a cubic exploitation unit, in the main exploitation strata.

3. The method for enhancing the recovery efficiency of the multilayer oil-gas reservoirs with the weave well patterns according to claim 2, wherein said measuring the physical parameters includes:
   measuring the length, the width and a height of the cubic exploitation units, and
      obtaining porosity, permeability and saturation of the cubic exploitation units from the geological model.

4. The method for enhancing the recovery efficiency of the multilayer oil-gas reservoirs with the weave well patterns according to claim 1, wherein the recovery efficiency of oilfields is calibrated by a numerical simulation method; the displacement efficiency is calculated out from a relative permeability curve; and the fitting parameters are calculated out by means of porosity and saturation.

5. The method for enhancing the recovery efficiency of the multilayer oil-gas reservoirs with the weave well patterns according to claim 1, wherein when i is an odd number, $x_i=\pi/2$ and $y_i=0$; when i is an even number, $x_i=0$ and $y_i=\pi/2$.

* * * * *